Patented Mar. 31, 1942

2,278,128

UNITED STATES PATENT OFFICE 2,278,128

DESULPHURIZED POLYSULPHIDE POLYMER AND PROCESS OF MAKING

Joseph C. Patrick, Morrisville, Pa., assignor to Thiokol Corporation, Trenton, N. J., a corporation of Delaware No Drawing. Application September 18, 1940, Serial No. 357,230

11 Claims. (Cl. 260—79)

This invention relates to organic polysulphide polymers and is a continuation-in-part of my copending applications Serial No. 28,614, filed June 27, 1935, and Serial No. 168,522, filed October 11, 1937.

As set forth in my Patent No. 2,195,380, issued May 26, 1940, and in my copending application Serial No. 267,389, filed April 12, 1939, the organic polysulphide polymers (which may be produced by reaction between alkaline polysulphides and compounds containing two carbon atoms to each of which is attached a substituent which is split off during the reaction) are, generally, polymers of a unit selected from the group

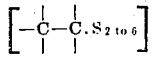

where

represents two adjacent carbon atoms, and

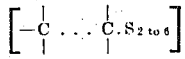

where

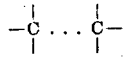

represents two carbon atoms separated by and joined to intervening structure.

Generically therefore the polysulphide polymers can be defined as polymers of the units shown above.

The polysulphide polymers may be obtained by reaction between an alkaline polysulphide and, generically, compounds having two carbon atoms to each of which is attached a substituent which is split off during the reaction. Such a compound may have the skeleton carbon structure

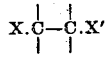

(where

represents two adjacent carbon atoms) or

(where

represents two carbon atoms joined to and separated by intervening structure). X and X' are, generically, substituents split off during the reaction.

Generically therefore these compounds can be defined as having the formulas

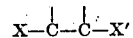

where the carbon atoms are adjacent and

where the carbon atoms are joined to and separated by intervening structure.

The alkaline polysulphides have, generically, the formula $AS_{2\ to\ 6}$ where A is an alkali metal, an alkaline earth metal, ammonium or substituted ammonium. Thus the alkaline polysulphide may have the formulae $AS_2$, $AS_3$, $AS_4$, $AS_5$ or $AS_6$. Fractional values between these integers may be obtained by mixtures. Thus $AS_{2.5}$ signifies a mixture of equal parts of $AS_2$ and $AS_3$.

When an alkaline polysulphide having a proportion of sulphur greater than corresponds to $AS_2$ and represented by 3 to 6 sulphur atoms in the molecule (e. g., an alkaline polysulphide having a formula $AS_{3\ to\ 6}$) reacts with an organic compound having the formula

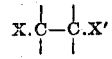

or

as above defined the resulting polymer will be substantially a polymer of the units

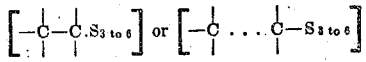

In the equations and formulae written below the unit

is employed but it will be understood that in all these cases the unit

may be substituted. There is no single acceptable arbitrary symbol covering both these skeleton structures and the use of the symbol

is therefore dictated purely by the absence of suitable or acceptable chemical "shorthand" symbolism.

My Patent 2,216,044, dated September 24, 1940, clearly points out the advance in the art represented by the "intervening linkage" type of polymer over the "adjacent carbon atom" type. This invention is directed to a generic technique of desulphurization applicable to polymers of both types generically or to polymers of either type specifically, after they have been produced.

Polysulphide polymers may be produced by other than the polysulphide reaction, for example, by reacting a compound having the formula

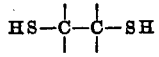

with an oxidizing reagent, a polymer of the unit

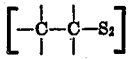

is obtained and by reacting this with elementary sulphur polymers of the unit

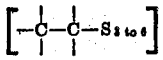

may be produced.

It has been discovered that said polymers of the unit

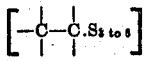

react with desulphurizing agents according to the equations, for example,

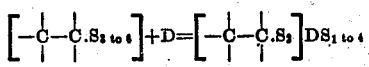

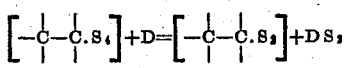

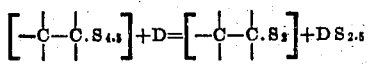

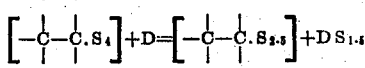

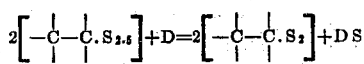

where D is, generically, a desulphurizing agent.

This is owing to the fact that the sulphur of these polymers in excess of that corresponding to the disulphides

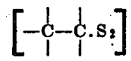

is in labile form and reacts readily with desulphurizing agents or substances capable of combining with sulphur and said labile sulphur is therefore capable of being removed, in whole or in part.

It has further been discovered that this complete or partial removal of labile sulphur causes an improvement in physical properties, e. g., elasticity and tensile strength.

The objects of the invention therefore include the following:

1. To react polymers of the unit

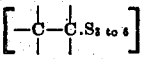

with a desulphurizing reagent.

2. To react polymers of the unit

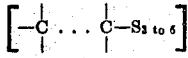

with a desulphurizing reagent.

3. To react a desulphurizing agent with the polymeric reaction product of an alkaline polysulphide having the formula $AS_{3\ to\ 6}$ and an organic compound having two carbon atoms joined to and separated by intervening structure to each of which carbon atom is attached a substituent split off during the reaction.

4. To react a desulphurizing agent with the polymeric reaction product of an alkaline polysulphide having the formula $AS_{3\ to\ 6}$ and an organic compound having two adjacent carbon atoms to each of which is attached a substituent which is split off during the reaction.

5. To bring about the creation or development of new and improved properties as a result of the partial or complete removal of labile sulphur caused by the action of the desulphurizing agent.

The invention is not limited to the application of a desulphurizing agent to a specific polymer or class of polymers but extends to and includes a generic chemical technique or mechanism for removing labile sulphur from polysulphide polymers generally.

That technique may be expressed by the simple equation

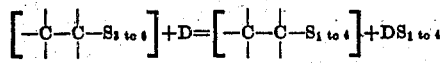

Nor is the invention confined to any specific desulphurizing agent. The reaction is preferably carried out while the polymer is dispersed in an alkaline aqueous serum or dispersion medium and when so effected, the desulphurizing agent is preferably a water soluble alkaline desulphurizing agent, e. g., an alkaline monosulphide, hydrosulphide, sulphite, hydroxide, hydrosulphite, etc., but numerous other desulphurizing agents may be employed.

The polymer both before and after the desulphurizing treatment is preferably employed and obtained, respectively, in an intermediate form capable of being cured by a subsequent curing reaction or heat treatment, as set forth, for example in my United States Patents No. 2,142,144 and No. 2,195,380, issued January 3, 1939, and March 26, 1940, respectively. See Examples 2 and 3 of United States Patent No. 2,142,144 and Examples 2, 4, 7 and 9 of United States Patent No. 2,195,380.

The principles and scope of the invention have been explained above and will be defined in the claims. A specific embodiment of said principles will be illustrated by the following example:

*Example.*—Into a closed reaction tank suitably equipped with stirring means, pipe coils for steam and cold water and a thermometer, are placed 2,000 liters of 3-molar sodium tetrasulphide solution. To the polysulphide solution are added with vigorous agitation, 10 kilograms of caustic soda dissolved in 15 liters of water. This is followed by the addition of 25 kilograms of crystallized magnesium chloride ($MgCl_2.6H_2O$) dissolved in 20 liters of water.

The polysulphide mix is heated to about 135° F. and about 700 kilograms (5 kilogram mols) of BB' dichlorethyl ether are added gradually over a period of about three hours. The rate of addition of the dichloro ether is so regulated as to prevent the temperature from going above about 210° F. during the reaction.

When all the chloro ether has been added and the temperature shows a tendency to drop, steam may be admitted to the heating coils and so regulated as to maintain a temperature of from 215° to 200° F. for about three hours during which time the latex-like dispersion of the polymer is constantly stirred or agitated. The heating step just described is carried out in order that the excess of polysulphide over that actually required to decompose the dichlor ether may exert a condensing or polymerizing effect on the reaction product as first formed.

The finely divided latex-like dispersion of the polymer may now be freed from water-soluble impurities by any suitable means, such as filtration and repeated washing with water, or it may be washed by repeated settling of the particles and removal of supernatant liquid, followed by re-suspension in clean water and repetition of the settling process. The washing produces a purified latex-like dispersion of the polymer which is now submitted to desulphurization as follows:

Add 250 kilograms (6.25 kilogram mols) of NaOH dissolved in 500 liters of water, raise the temperature to 212° F. and maintain there for about 30 minutes. Then cool and purify the resulting latex as above described.

The washed latex-like dispersion may now be used as such or the polymer from which labile sulphur has been removed may be separated from the latex by coagulation or evaporation of the water. Coagulation may be produced by rendering the latex slightly acid.

In the above example the polymer prior to desulphurization, is a polymer of the unit $$[-C_2H_4.O.C_2H_4.S_4-]$$

and by the action of the NaOH at elevated temperatures is changed into a polymer of the unit $$[C_2H_4.O.C_2H_4.S_2]$$

As further specific examples, any of the organic compounds listed in Tables 1, 2, 3 and 4 in my United States Patent No. 2,195,380, on pages 3 and 4 of my United States Patent No. 2,142,144, and in my copending applications Serial No. 218,874, filed July 12, 1938, now United States Patent No. 2,216,044, and Serial No. 267,389, filed April 12, 1939, may be substituted for the dichlorethyl ether of the above specific example. Where X or X' or both are directly attached to an aromatic nucleus, the conditions under which the polymer is formed (prior to desulphurization) by the polysulphide reaction should be more drastic as illustrated by Example 8 of my copending application Serial No. 218,874, filed July 12, 1938, now United States Patent 2,216,044, in order to split off the said X and/or X' substituents from the aromatic nucleus.

Among the compounds so listed or those that may be substituted for the BB' dichlorethyl ether in the above specific example, the following may be specifically herein set forth:

$$Cl.CH_2-CH_2.Cl$$

ethylene dichloride (and olefin dichlorides in general.)

$$Cl.CH_2.CH_2.O.CH_2.O.CH_2.CH_2.Cl$$

di (beta chlor ethoxy) methane, or di (beta chlor ethyl) formaldehyde acetal.

$$Cl.CH_2.CH_2.O.CH_2.CH_2.O.CH_2.CH_2.Cl$$

di (beta chlor ethoxy) ethane, or di (beta chloro ethyl) ether of ethylene glycol, or beta chlor ethoxy chloro ethyl ether.

$$Cl.CH_2.CH_2.O.CH_2.CH_2.O.CH_2.CH_2.O.CH_2.CH_2.Cl$$

BB' di (chloroethoxy) ethyl ether, or di (beta chloro ethoxy) diethylene glycol, or tetraethylene glycol dichloride.

The invention may be advantageously applied to polymers made by substituting for the specific ether in the above example compounds in general having one or more ether linkages such as those having the formula $$X.R^1.O.R^2.X'$$

where $R^1$ and $R^2$ are the same or different alkyl, aralkyl or aryl radicals, $$X.(R^1.O).R^2.O.R^3.(OR^4).X'$$

where $R^1$, $R^2$, $R^3$ and $R^4$ are the same or different alkyl, aralkyl or aryl radicals, $$X.(R^1O).R^2.O.R^3.X'$$

where $R^1$, $R^2$ and $R^3$ are the same or different alkyl, aralkyl or aryl radicals, $$X.(R^1O).R^2.(OR^3).X'$$

where $R^1$, $R^2$ and $R^3$ are the same or different alkyl, aralkyl or aryl radicals.

When polymers made from compounds having the above formulae where $R^1$, $R^2$, $R^3$ and $R^4$ are alkyl radicals, are reacted with a desulphurizing agent and some or all of the labile sulphur thereby removed, the resulting product is found to be greatly improved in respect of tensile strength, elasticity and other desirable qualities, including the ability to withstand low temperatures without serious impairment of elasticity and strength. The improvement is particularly noted in the polymer when it is heated and cured and thus transformed from the intermediate stage to the final stage.

Examples of compounds having more than two substituents, which may be used to make a polymer to be subjected to desulphurization are as follows:

$$\begin{array}{c} Cl \\ \diagdown \\ CH.CH_2.Cl \quad (1\text{-}1,\ 2\ \text{trichlor ethane}) \\ \diagup \\ Cl \end{array}$$

$Cl.CH_2.CHCl.CH_2.CH_2.Cl$ (1, 2, 4 trichlor butane)

$Cl.CH_2.CHCl.CHCl.CH_2.Cl$ (1, 2, 3, 4 tetrachlor butane)

$C_6H_3(CH_2Cl)_3$ (trichlor mesitylene)

and other compounds as set forth in my copending application Serial No. 293,090, filed September 1, 1939.

Among the numerous instances which might be cited to illustrate the utility of the present invention and the advantages flowing from its use the following may be mentioned:

When an intermediate polymer made by reacting sodium tetrasulphide with BB' dichlor ethyl ether is compounded with about ten parts by weight of zinc oxide and sixty parts by weight of carbon black and cured by heating, the rubber-like particles obtained which while possessing numerous valuable properties including high resistance to a number of solvents, has a tensile strength of about 900 pounds per square inch and an elongation at break of about 250%. If now the labile sulphur is removed from said intermediate polymer before curing and the resulting desulphurized or stripped polymer subjected to the same cure, it will be found that the resulting cured compound possesses a greatly increased tensile strength and elongation at break, to wit: about 2,000 pounds per square inch tensile strength and about 400 to 450% elongation at break. At the same time the resistance to solvents has not been decreased and there is a substantial increase in abrasion resistance and general chemical stability. In other words, there is produced a compound having a combination of high tensile strength, elasticity and stability toward solvents. Such combination of qualities is highly desirable in a synthetic rubber-like polymer.

Another marked development of new properties is illustrated by the fact that if the stripped polymer, as for example in its cured condition, is employed to make a structure having a surface which if made from rubber would generate static electricity by friction and the like, the said structure does not develop static electricity and finds use in the manufacture of numerous articles for use where the generation of static electricity is undesirable, as for example, guides and rolls employed in the textile industry which come in contact with silk, cotton, wool, synthetic fibres, etc. This unique property is developed by the removal of the labile sulphur and is characteristic of the disulphide polymers as distinguished from the polymers having a higher sulphur rank, that is to say, a higher proportion of sulphur in the polymer. This particular aspect of the invention is more fully set forth in allowed application Serial No. 125,271, filed February 11, 1937, now United States Patent No. 2,218,176.

I claim:

1. The process which comprises reacting a desulphurizing agent with a substance which is substantially a polymer of a unit selected from the group consisting of

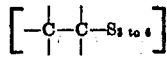

and

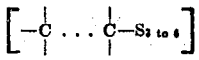

where

represents adjacent carbon atoms and

represents carbon atoms separated by and joined to intervening structure.

2. The product which is substantially identical with that obtained by the process of claim 1.

3. The process which comprises reacting a desulphurizing agent with a polymer obtained by reacting an alkaline polysulphide having a proportion of sulphur represented by 3 to 6 sulphur atoms in the molecule with an organic compound having two carbon atoms to each of which is attached a substituent which is split off during the reaction.

4. The process which comprises reacting a desulphurizing agent with a polymer obtained by reacting an alkaline polysulphide having a proportion of sulphur represented by 3 to 6 sulphur atoms in the molecule with an organic compound having the formula

where

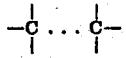

represents two carbon atoms joined to and separated by intervening structure and X and X' are substituents split off during the reaction.

5. A product obtained by the process of claim 4.

6. The process which comprises reacting a desulphurizing agent with a polymer obtained by reacting an alkaline polysulphide with an organic compound having the formula

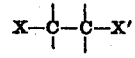

where

represents two adjacent carbon atoms and X and X' are substituents split off during the reaction.

7. A product substantially identical with that obtained by the process of claim 6.

8. The process which comprises reacting a desulphurizing agent with the polymeric reaction product of an alkaline polysulphide having a proportion of sulphur represented by 3 to 6 sulphur atoms in the molecule and BB' dichloroethyl ether.

9. The product substantially identical with that obtained by the process of claim 8.

10. The process which comprises reacting a desulphurizing agent with the polymeric reaction product of an alkaline polysulphide having a proportion of sulphur represented by 3 to 6 sulphur atoms in the molecule and B chloroethoxy B' chloroethyl ether.

11. The product substantially identical with that obtained by the process of claim 10.

JOSEPH C. PATRICK.